(Model.)
J. B. MORRIS.
KNOB ATTACHMENT.
No. 283,718. Patented Aug. 21, 1883.
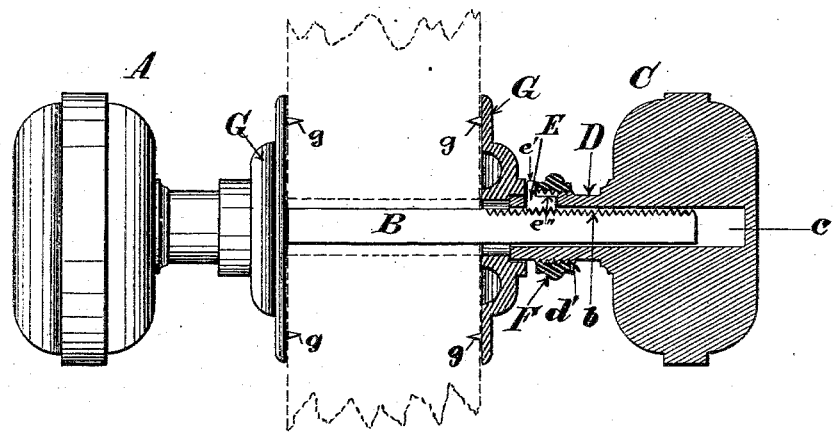
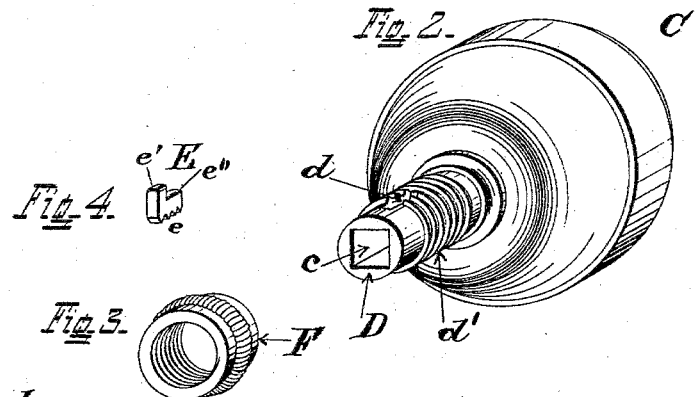
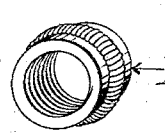
Attest
Carl Spengel
Wm F. Fayert
Inventor
John B. Morris
by Knight Bros Atty's

UNITED STATES PATENT OFFICE.

JOHN B. MORRIS, OF CINCINNATI, OHIO, ASSIGNOR OF ONE-HALF TO THOMAS S. IRELAND, OF SAME PLACE.

KNOB ATTACHMENT.

SPECIFICATION forming part of Letters Patent No. 283,718, dated August 21, 1883.

Application filed June 14, 1883. (Model.)

*To all whom it may concern:*

Be it known that I, JOHN B. MORRIS, of Cincinnati, Hamilton county, and State of Ohio, have invented a new and useful Improvement in Door-Knobs, of which the following is a specification.

The invention relates, primarily and chiefly, to a construction which enables the ready and secure attachment of the separable knob of a door-lock handle.

In the accompanying drawings, Figure 1 is an axial section of a pair of door-knobs embodying my improvement. Figs. 2, 3, and 4 show the separable knob, the nut, and the gib detached. Fig. 5 shows a portion of the spindle.

One knob, A, is fixed in the usual way to the square rod B, constituting the knob-spindle. The spindle B is serrated, as at $b$, on one side of it, near the end remote from the fixed knob A. The separable knob C has a deep axial hole, $c$, of corresponding shape to but a little larger than the spindle B. The neck D of the separable knob C has a radial slot, $d$, which extends from the said axial hole $c$ to the said neck's periphery. Said periphery is screw-threaded, as at $d'$.

E is a gib which is adapted to fit and occupy the slot $d$. Serrations $e$ on the inner edge of gib E fit the serrations $b$ of spindle B. An ear, $e'$, that projects from said gib E operates, when said gib is in place, to prevent contact of the nut and washer, to be presently described. The less elevated portion $e''$ of said gib reaches only to the bottoms of the screw-threads of said neck.

The screw-threaded periphery of the neck D carries a nut, F, which (after the separable knob has been adjusted to its proper place upon the spindle and the gib E dropped into the slot $d$) is screwed forward over the portion $e''$ of said gib until it touches the ear $e'$, so as to hold the gib down within the said slot, and by so doing to lock the separable knob securely in place.

Associated with the above construction I use preferably washers or rosettes G, having spurs $g$ on their rear sides, which, being sunk into the door, hold the washers against rotation and supersede necessity of holes for fastening-screws.

The above-described means of attaching the knobs of a door lock or latch obviously dispense with all of the screws customarily employed, which, besides being unsightly, are well known to be liable to drop off and be lost.

The intervention of the ear $e'$ between the washer G and the nut F prevents any rotation or slackening of the nut by the act of operating the knob.

I claim as new and of my invention—

1. The combination of spindle B, having serrations, a knob, C, having a deep axial hole, $c$, to receive the end of the spindle, and formed with a neck, D, having a screw-thread, $d'$, and a radial slot, $d$, a nut, F, secured to the neck to work on said screw-thread, and a gib, E, located in the radial slot, having serrations $e$ on its inner side to engage the serrations on the spindle, and held in locking position by the thread of the nut, as set forth.

2. The combination of spindle B, having serrations $b$, a knob, C, having a deep axial hole, $c$, to receive the end of the spindle, and formed with a neck, D, having a screw-thread, $d'$, and a radial slot, $d$, through said screw-thread, a nut, F, to work on said screw-thread and over the slot, and a gib, E, located in the radial slot, having serrations $e$ on its inner side to engage the serrations on the spindle, a portion, $e''$, for the nut to bear upon, and an ear, $e'$, to limit the movement of the latter, as set forth.

In testimony of which invention I hereunto set my hand.

JOHN B. MORRIS.

Attest:
GEO. H. KNIGHT,
SAML. S. CARPENTER.